May 16, 1967 A. RUSCH, JR 3,320,083

METHOD OF MAKING MAGNETIC TAPES

Filed June 21, 1963

INVENTOR,
ADOLPHE RUSCH JR.

BY Edward J. Kelly
ATTORNEY.

United States Patent Office 3,320,083
Patented May 16, 1967

3,320,083
METHOD OF MAKING MAGNETIC TAPES

Adolphe Rusch, Jr., Rumson, N.J., assignor to the United States of America as represented by the Secretary of the Army Filed June 21, 1963, Ser. No. 289,765
1 Claim. (Cl. 117—4)

The invention described herein may be manufactured and used by or for the Government for governmental purposes, without the payment of any royalty thereon.

This invention relates in general to a method of making reinforced plastic magnetic recording tapes, and in particular, to a method of making individual, no-fraying, reinforced plastic magnetic recording tapes of prescribed widths from a wide sheet of reinforcing material of ultra-thin inorganic textile yarns and/or ultra-thin organic textile yarns.

Reinforced plastic magnetic recording tapes are disclosed and claimed in my pending U.S. patent application Ser. No. 142,988 filed Oct. 4, 1961, Patent No. 3,179,533. In that application, a magnetic tape is described wherein the plastic backing material for the tape is reinforced with woven or simulated woven ultra-fine size continuous filament inorganic (glass) yarns and/or organic (saponified acetate) yarns. This reinforced plastic recording tape is found to have higher strength, less elongation and permanent set, greater dimensional stability, and greater adhesion to the magnetic coating than any type of plastic magnetic recording tape commercially available. All of these improved properties are due to the fact that the recording tape is reinforced with fine size inorganic and organic textile yarns.

In making the reinforced plastic magnetic recording tapes as described in the Ser. No. 142,988 application, the reinforcement which is composed of continuous multi-filament inorganic or organic yarns is imbedded in a suitable plastic film. The yarns are placed in the film either in the form of a warp (giving added longitudinal strength) or as woven or unwoven type fabrics which greatly increases the longitudinal and lateral strength of the film. This reinforced plastic film constitutes the magnetic recording tape backing material. The reinforced plastic backing material is then coated on one side with fine size particles of magnetic ferric oxide. After coating, the reinforced plastic coated material is slit lengthwise to the desired width to produce individual reinforced plastic magnetic recording tapes.

A difficulty encountered in making the tapes as above described is that when the reinforced plastic films are slit to produce the individual magnetic tapes, the edges of the slit tape are found to have loose longitudinal reinforcing threads. This is caused by the proximity of the reinforcing threads to the tape edges. These loose threads continue to unravel under slight stress or friction causing long lengths of loose threads which run lengthwise along the magnetic tape rendering the magnetic tape useless for electronic recording applications.

An object of this invention is to overcome the aforementioned difficulty. A further object of the invention is to provide a method of making individual, non-fraying, reinforced plastic magnetic recording tapes. A still further object of this invention is to provide a relatively inexpensive method of making individual, non-fraying, reinforced plastic magnetic recording tapes of prescribed widths from a wide sheet of a reinforcing material of ultra-thin inorganic textile yarns and/or ultra-thin organic textile yarns.

It has now been found that the aforementioned difficulties may be overcome and the above stated objects attained by a method as hereinafter described. According to the method, a wide sheet of reinforcing material of ultra-thin inorganic and/or organic textile yarns is first formed in such a manner that the longitudinal ends of the yarn are spaced in accordance with the desired widths of the individual, finished and reinforced plastic magnetic recordnig tapes. The wide sheet of reinforcing material is then impregnated and laminated with a suitable resin such as a polycarbonate resin. Thereafter, the plastic impregnated and laminated wide sheet of reinforcing material is coated on one of its surfaces with a magnetic ferric oxide coating. Then, the magnetic coated wide sheet of reinforced plastic is slit lengthwise at the points where the longitudinal ends of the yarn were initially spaced.

The invention can be best understood by referring to the accompanying drawing wherein.

Figures 1, 1A, 2, 2A:
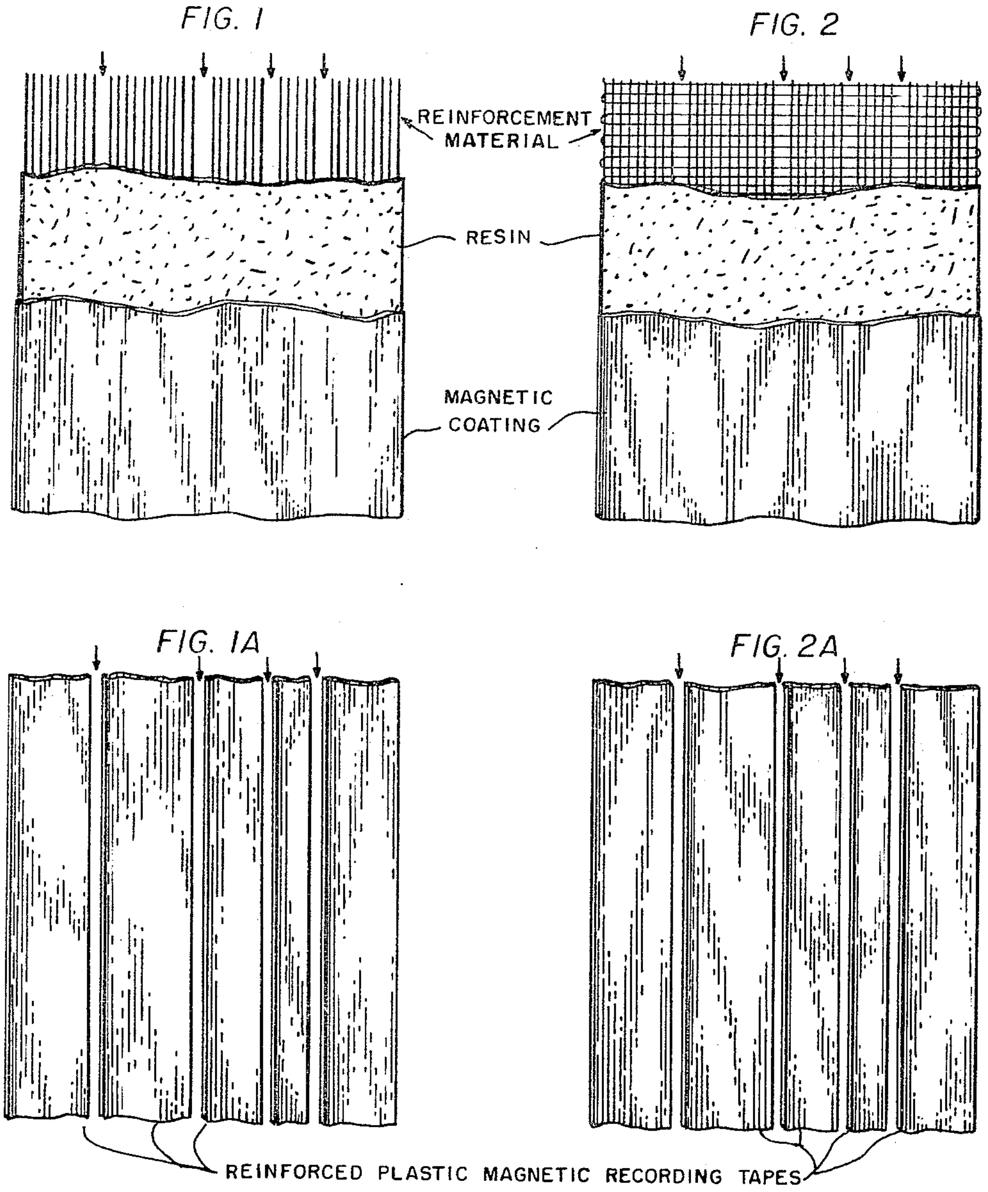
FIG. 1 shows a plan cut-away view of a wide sheet of unidirectional reinforcement material having longitudinal ends spaced in accordance with the desired widths of the finished tapes and imbedded in a plastic film one side of which bears a magnetic coating.
FIG. 1A shows the finished reinforced plastic magnetic recording tapes obtained from FIG. 1.
FIG. 2 shows a plan cutaway view of a wide sheet of a longitudinal and lateral reinforcement material having longitudinal ends spaced in accordance with the desired widths of the finished tapes and imbedded in a plastic film one side of which bears a magnetic coating.
FIG. 2A shows the finished reinforced plastic magnetic recording tapes obtained from FIG. 2.

Referring to FIG. 1, the wide sheet of unidirectional reinforcement material or longitudinal threads or ends are spaced as indicated to provide for five finished tapes of varying widths. The longitudinal ends can be composed of an inorganic yarn as for example, continuous multi-filament glass and/or an organic yarn such as continuous multi-filament saponified acetate. The particular tape width provided for will depend on the end use requirement. For example, ¼ inch and ½ inch tapes are generally used for audio, 1 inch tapes generally used for data processing and 2 inch tapes generally used for video. The reinforcement is first impregnated with a resin solution as for example, a polycarbonate resin or other suitable resin solution as in the Ser. No. 142,988 application followed by conventional finishing and calendering operations as also described in the Ser. No. 142,988 application. The resulting reinforced plastic is then coated on one of its surfaces with a magnetic ferric oxide as also described in the Ser. No. 142,988 application. The magnetic coated reinforced plastic of FIG. 1 is then slit lengthwise in the direction of the arrows and through the center of the space where only resin film is present due to the initial spacing of the longitudinal ends. The slitting may be accomplished by conventional means as by hot wire, knives, etc. The resulting tapes are shown in FIG. 1A.

Each of the five tapes shown in FIG. 1A bears a thin strip of plastic film on either side of the tape which contains no reinforcing ends and therefore no threads to fray.

Referring to FIG. 2, a wide sheet of woven reinforcement is spaced as indicated to provide for five finished tapes of varying widths. The woven reinforcement is composed of longitudinal and lateral threads or ends. The longitudinal threads or warp are composed of very fine size inorganic or organic yarns. The lateral threads or filling is composed of ultra-thin inorganic threads or ultra-thin organic threads as more fully detailed in the Ser. No. 142,988 application. The reinforcement is then treated in the same manner as was described in FIG. 1 and FIG. 1A. In this case, after slitting lengthwise in the direction of the arrows, the film edges will contain some lateral reinforcing threads. As the lateral threads cannot fray however, they cannot do any harm to the reliability of the resulting reinforced plastic magnetic recording tapes shown in FIG. 2A.

In the above description, the term ultra-thin as applied to yarns refers to threads having a diameter of less than one mil.

The foregoing description is considered to be merely illustrative and not in limitation of the invention as hereinafter claimed.

What is claimed is:

The method of making individual, non-fraying reinforced plastic magnetic recording tapes of prescribed widths from a wide sheet of reinforcing material, said reinforcing material comprising a plurality of threads of at least one member of the group consisting of ultra-thin inorganic textile yarns and ultra-thin organic textile yarns, said method consisting of: placing said plurality of threads into a planar configuration of longitudinally extending parallel threads to form the wide sheet of reinforcing material; arranging said longitudinally extending threads into spaced parallel groups whose widths correspond to the prescribed widths of the individual reinforced plastic magnetic tapes; impregnating and coating said wide sheet of reinforcing material with polycarbonate resin; coating said impregnated and coated wide sheet of reinforcing material on one of its surfaces with a magnetic ferric oxide coating material; and slitting the magnetic coated wide sheet of reinforced plastic lengthwise within the space formed by said spaced parallel groups.

References Cited by the Examiner

UNITED STATES PATENTS

| | | | |
|---|---|---|---|
| 1,534,033 | 4/1925 | Goldman | 139—54 |
| 1,805,568 | 5/1931 | Crolley et al. | 26—1.2 X |
| 2,461,240 | 2/1949 | Scruggs | 117—44 X |
| 2,547,170 | 4/1951 | Picanol | 139—54 |
| 2,610,936 | 9/1952 | Carlson | 161—143 X |
| 2,712,843 | 7/1955 | Ottinger et al. | 117—44 X |
| 2,755,196 | 7/1956 | Scholl | 117—4 |
| 2,887,454 | 5/1959 | Toulmin | 117—235 X |
| 3,144,882 | 8/1964 | Steiner | 139—54 |
| 3,179,533 | 4/1965 | Rusch | 117—76 |

WILLIAM D. MARTIN, *Primary Examiner.*

W. D. HERRICK, *Assistant Examiner.*